(12) United States Patent
Riego

(10) Patent No.: US 8,221,221 B2
(45) Date of Patent: Jul. 17, 2012

(54) METRICS-BASED GAMING OPERATIONS

(75) Inventor: Joseph Riego, Foster City, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 975 days.

(21) Appl. No.: 12/283,854

(22) Filed: Sep. 15, 2008

(65) Prior Publication Data
US 2010/0069156 A1 Mar. 18, 2010

(51) Int. Cl.
A63F 13/00 (2006.01)
A63F 9/24 (2006.01)
G06F 17/00 (2006.01)
G06F 19/00 (2006.01)
A63F 13/12 (2006.01)

(52) U.S. Cl. ............... 463/23; 463/16; 463/29; 463/33; 463/42; 273/138.1; 273/139; 705/67; 705/75; 902/23

(58) Field of Classification Search .............. 463/16–23, 463/25–33, 39–43; 273/138.1, 139, 138.2, 273/141 A, 454–456, 460; 705/56–57, 64, 705/67, 72, 74–75, 78–79; 902/2–3, 23, 902/38, 40
See application file for complete search history.

(56) References Cited

U.S. PATENT DOCUMENTS

| 5,772,508 | A  * | 6/1998 | Sugita et al. ................ 463/36 |
| 6,381,628 | B1   | 4/2002 | Hunt |
| 6,519,571 | B1   | 2/2003 | Guheen et al. |
| 6,622,087 | B2   | 9/2003 | Anderson |
| 6,694,316 | B1   | 2/2004 | Langseth et al. |
| 6,859,784 | B1   | 2/2005 | van Duyne et al. |
| 6,970,881 | B1   | 11/2005 | Mohan et al. |
| 7,089,237 | B2   | 8/2006 | Turnbull et al. |
| 7,143,358 | B1   | 11/2006 | Yuen |
| 7,753,789 | B2 * | 7/2010 | Walker et al. ................ 463/42 |
| 7,780,529 | B2 * | 8/2010 | Rowe et al. .................. 463/42 |
| 7,782,297 | B2 * | 8/2010 | Zalewski et al. ............ 345/156 |
| 2003/0211890 | A1 * | 11/2003 | Gendo et al. ................ 463/43 |
| 2004/0005919 | A1 * | 1/2004 | Walker et al. ................ 463/23 |
| 2004/0097287 | A1 * | 5/2004 | Postrel ........................ 463/41 |
| 2005/0014543 | A1 * | 1/2005 | Itoi et al. ..................... 463/8 |
| 2006/0201580 | A1   | 9/2006 | Kang |
| 2006/0211493 | A1 * | 9/2006 | Walker et al. ................ 463/29 |
| 2006/0217194 | A1 * | 9/2006 | Walker et al. ................ 463/29 |
| 2006/0287096 | A1 * | 12/2006 | O'Kelley et al. ............. 463/42 |
| 2006/0287099 | A1 * | 12/2006 | Shaw et al. .................. 463/42 |
| 2007/0101276 | A1   | 5/2007 | Yuen |
| 2007/0238528 | A1   | 10/2007 | Harris et al. |
| 2007/0265718 | A1   | 11/2007 | Graepel |
| 2007/0287518 | A1   | 12/2007 | Nagel |
| 2007/0298879 | A1 * | 12/2007 | Kobayashi et al. ........... 463/31 |
| 2008/0243597 | A1   | 10/2008 | Ballow et al. |
| 2009/0082082 | A1 * | 3/2009 | Carr-Gregg et al. .......... 463/20 |
| 2009/0131151 | A1 * | 5/2009 | Harris et al. ................. 463/22 |
| 2010/0094692 | A1 * | 4/2010 | Meyerhofer et al. ....... 705/14.12 |

* cited by examiner

Primary Examiner — Arthur O. Hall
(74) Attorney, Agent, or Firm — Lewis and Roca LLP

(57) ABSTRACT

Methods and systems for metrics-based gaming operations are provided. Information concerning game play for each play may be received and stored. Such information may be used to generate certain metrics. The generated metrics, in turn, may be used to determine how to customize a game operation. Such game operations may include providing training to a player, matching a player up with another player or with a team, adjusting a game event, etc.

12 Claims, 5 Drawing Sheets

METRICS-BASED GAMING OPERATIONS

BACKGROUND OF THE INVENTION

1. Field of the Invention

The present invention generally relates to electronic gaming. More specifically, the present invention relates to metrics-based gaming operations in electronic games.

2. Description of Related Art

As electronic gaming and networking technologies have become more advanced, the complexity of games has increased accordingly. As a result, there may be more complex storylines, game play objectives, missions and tasks, capabilities associated with game play avatars, and scoring. Scoring may occur and be weighted in various ways and likewise be determined in various categories or on an individual or team basis.

Many games are also network or community-based with multiple players located around the country or around the world. Such games may involve the multiple players playing competitively and/or cooperatively in teams amongst each other. Some games, such as Massive Multiplayer Online Role Playing Games (MMORPGs), may allow for hundreds, if not thousands of players, to interact with one other. While the ability to interact and compete with so many other players may increase user enjoyment and challenges, certain complexities in dealing with so many players inevitably arise.

One example may involve evaluating players and their game play. A player may wish to evaluate other players for various reasons, including team-building, community-building, or finding a mentor/trainer. While some games allow users to view scoring information, certain information associated with the scoring information may not be readily available or available in sufficient detail to allow for adequate evaluation of game play. For example, a user may wish to find a player who is particularly strong in a certain aspect of the game. Where raw scores fail to convey such information, a user may have to obtain such information by observing the game play of multiple candidates over multiple gaming sessions. Such an undertaking may be extremely time-consuming, inefficient, and produce results that may very quickly become obsolete.

The significance of the aforementioned problems only increases as the complexity of electronic games increases. Modern video game systems are able to accommodate and provide for an increasing number of players and gaming statistics on each player. Thus, it is becoming even more difficult and complex for game players to evaluate themselves and each other. Consequently, it would enrich the video game experience to allow for complex analysis of game play information. Such information may also be used to customize gaming operations. There is, therefore, a need for methods and systems for metrics-based gaming operations.

SUMMARY OF THE INVENTION

The present invention provides for methods and systems for metrics-based gaming operations. Information concerning game play for each play may be received and stored. Such information may be used to generate certain metrics. The generated metrics, in turn, may be used to determine how to customize a game operation. Such game operations may include providing training to a player, matching a player up with another player or with a team, adjusting a game event, etc.

Various embodiments of the present invention include methods for metrics-based gaming operations. Such methods may include receiving information about game play in a game session, providing the information to a database for storage, generating metrics based on the received information, determine instructions for customizing a game operation based on the game metrics, and providing the instructions for use in customization. Some embodiments may further include determining a training curriculum for a player, creating or adjusting training videos based on the determined curriculum, and matching the player with a trainer based on the curriculum. Further embodiments may include matching the player with another player or group of other players for team play. Still further embodiments may include adjusting game events based on game metrics.

Some embodiments of the present invention include systems for metrics-based gaming operations. Such systems may include a database for storing information concerning game play of a player in a game session, a processor for generating metrics based on analysis of at least the stored information and for determining instructions for customizing a game operation based on the metrics, and a network interface for providing information for use in customizing game operations. Further embodiments may include a repository for training videos, a training video module, a matching tool, and a report generator.

Embodiments of the present invention may further include computer-readable storage media having embodied thereon programs that, when executed by a computer processor device, perform methods for metrics-based gaming operations.

DETAILED DESCRIPTION

The present invention provides for methods and systems for metrics-based gaming operations. Information concerning game play for each player may be received and stored. Such information may be used to generate certain metrics. The generated metrics, in turn, may be used to determine how to customize a game operation. Such game operations may include providing training to a player, matching a player up with another player or with a team, or adjusting a game event in light of player capabilities.

The elements identified throughout are exemplary and may include various alternatives, equivalents, or derivations thereof. Various combinations of hardware, software, and computer-executable instructions may be utilized. Program modules and engines may include routines, programs, objects, components, and data structures that effectuate the performance of particular tasks when executed by a processor, which may be general purpose or application specific. Computer-executable instructions and associated data structures stored in a computer-readable medium represent examples of programming means for executing the steps of the methods and/or implementing particular system configurations disclosed herein.

Figure 1:
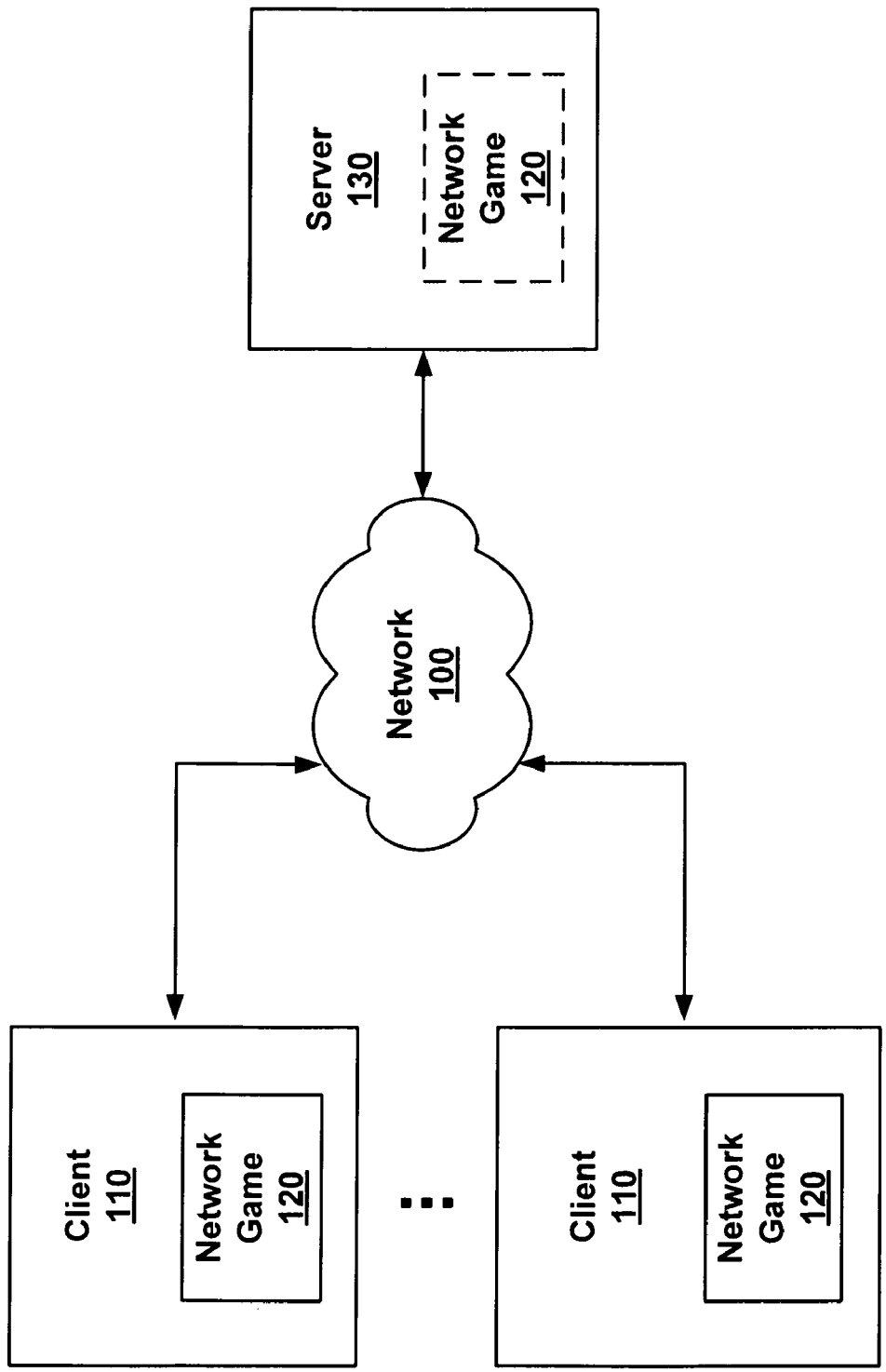
FIG. 1 illustrates an implementation of a communications network providing for metrics-based gaming operations.

FIG. 1 illustrates an implementation of a communications network 100 providing for metrics-based gaming operations. One or more clients 110 may include one or more network games 120. Network game 120 may be built-in (e.g., preloaded) to the client 110 or be introduced through an optical disk or other data storage medium. Network game 120 may also be obtained over a network from a server 130. The client 110 may be connected to a server 130 via a communications network 100 or to one another through an ad hoc network.

The client 110 may be representative of a game console such as a PlayStation® 3. Laptop computing devices, a portable game device such as the PlayStation® Portable, a desktop computing device, a cellular telephone, or any other device capable of executing the network game 120 and connecting to the network 100 or, alternatively, an ad hoc network are further examples of client 110. The client 110 may be identified by an identification number such as a client ID or an address mechanism such as an IP address. A user of the client 110 may also 'sign on' to a network with a user name and/or password, which may be temporarily or permanently associated with the client 110.

In some embodiments, the server 130 may host the network game 120. The clients 110 may access the network game 120 on the server 130 via the network 100. The network game 120 on the server 130 may be the entire game, a portion of the game, data related to the game or simply a node allowing for the pass though, observation and/or collection of data related to the network game 120 as the network game 120 is played by users in the game community. The network game 120 may be similarly organized at various clients 110 (e.g., portions of the game or game data related to the game). Network game 120 may also be provided through, for example, a third-party content library server.

It should be understood that the reference to a client 110 and a server 130 is merely for the convenience of understanding various embodiments of the present invention. Embodiments of the present invention may be implemented in the context of a peer-to-peer network, a client-server network, or within a peer-group (e.g., a specified group of peers). Therefore, in some instances, a client may function as a server and vice versa depending on the timing and the nature of a data exchange. For example, various clients in a peer-to-peer network may each host a portion of a network game 120 or data related to that network game 120 and may send and receive the same. As such, any reference to a client or a server is meant to be inclusive of operations performed by one or both computing entities unless specified otherwise by a specific limitation in the claims. In some instances, a device with client/server functionality may be referred to by the generic moniker, 'network node,' 'computing node,' or 'network device.' In that regard, client 110 and server 130 may both be considered network or computing nodes or a network device.

The network game 120 may include software that may be processed on or by the client 110 and/or that allows for or facilitates communication and data exchanges with the other clients 110 and server 130 via the network 100. The network 100 may include, for example, the Internet. Other proprietary or closed networks may be used either exclusively or in conjunction with the Internet. Certain security protocols (e.g., SSL or VPN) or encryption methodologies may be used to ensure the security of data exchanges over network 100, especially if the network 100 is a publicly accessible network such as the Internet.

Users associated with each of the clients 110 may interact with other users playing the network game 120. Accordingly, the users at each of the clients 110 may compete with one another despite not being physically present with one another or sharing a common gaming device or console.

In one exemplary embodiment, the server 130 may monitor the users playing the network game 120 via the network 100. The clients 110 may request data from the server 130, such as information pertinent to the particular network game 120 being played. Any type of communication exchange between the clients 110 and the server 130 is within the scope of the various embodiments of the present invention. Further, in some embodiments, more than one server 130 may be connected to the network 100 for the purpose of communicating with the clients 110. For example, back-up or redundancy servers as well as servers with particular tasks such as storing identification information or preferences related to a particular user as well as servers tasked with certain DRM, advertising, or payment responsibilities.

Figure 2:
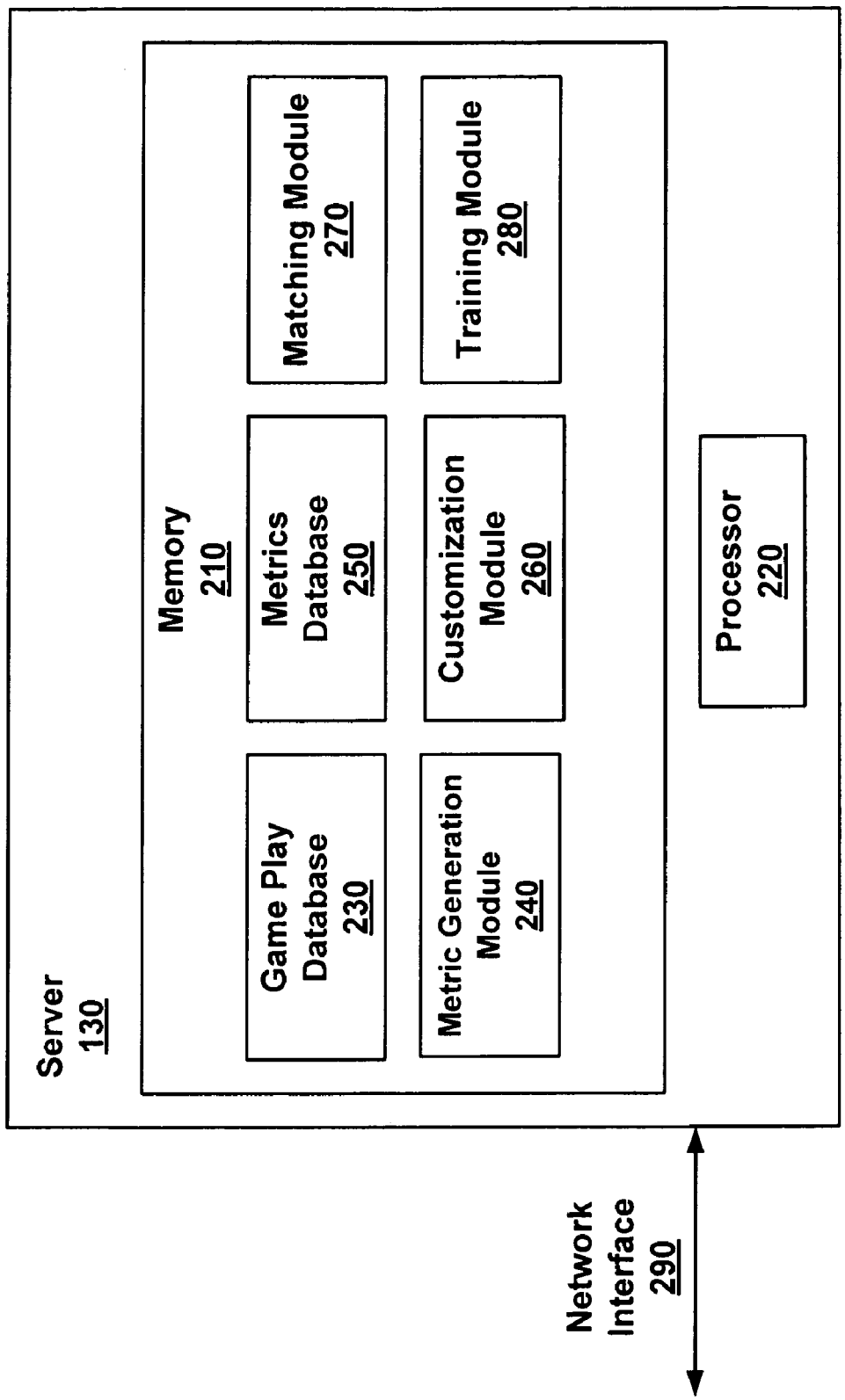
FIG. 2 illustrates an exemplary server for metrics-based gaming operations.

FIG. 2 illustrates an exemplary server 130 as may be utilized in metrics-based gaming operations. Server 130 may include a memory 210 and a processor 220. Memory 210 may include a game play database 230, metric generation module 240, metrics database 250, customization module 260, matching module 270, and training module 280. Server 130, and its components, may communicate with various other members of communication network 100 via a network interface 290.

Memory 210 may be specifically configured to include any type and/or combination of databases and software modules in addition to being generally configured for storing information. Memory 210 may reside on and be integrated with server 130 or be housed separately. In the instance of memory 210 being separately housed, the various components of server 130 may be communicatively coupled to and provide information to various other components of network 100.

Processor 220 may be configured to execute various modules (e.g., metric generation 240 customization 260, matching 270, and training 280) and retrieve data from various databases (e.g., game play 230 and metrics 250). Processor 220 may be a multi-core chip like the Cell Broadband Architecture Engine (CBEA) from Sony Computer Entertainment, Toshiba, and IBM (the STI Alliance). The CBEA includes a Power Processing Element (PPE) and multiple (e.g., eight) Synergistic Processing Elements (SPE). The PPE and SPEs are linked together by an internal high speed bus—an Element Interconnect Bus (EIB). The PlayStation®3 from Sony Computer Entertainment Inc. implements the CBEA.

Execution of certain modules may involve processor 220 using information stored in a database of memory 210 for various analyses undertaken by one or more other modules. A module (or application), as referenced in the present invention, is inclusive of a collection of routines that perform various functions when executed. A module may be dynamically loaded and unloaded by hardware and device drivers as required. The modular software components described herein may also be incorporated as part of a larger software platform or integrated as part of an application specific component.

Game play database 230 may be configured to store information concerning game play of a player during a game session. Such information may be defined by certain benchmarks or trigger events. These definitions may be determined by a game developer of a particular game, a system or network administrator, or a combination of the foregoing.

Information stored in game play database 230 may be generated and/or retrieved from a game utilizing extensible markup language (XML) or a variant thereof. Through the use of XML, a game developer or system administrator (e.g., an administrator for a network or service maintaining game metric information) may define individual elements (e.g., the aforementioned trigger events) in game play. The developer or administrator may further allow an information processing system (like that of FIG. 2) to structure and manipulate that data as defined by the XML tags. Any variety of conforming processor and/or validating processor modules may be implemented and executed with respect to processing well-formed and/or semantically valid sets of data in an effort to extract information for subsequent storage and metric generation.

The foregoing may pertain to games developed and authored with a metrics-based game play system in mind. Embodiments of the present invention may further be implemented in certain legacy games. Legacy games may include those games that were developed and distributed prior to implementation of a metrics-based game play system as described herein.

In one embodiment of legacy game title metric processing, certain information or sets of information may be extracted (with or without the like of XML tags) and translated into data that may be of use to the presently described metrics-based game play system. For example, the particular adeptness at which a game player achieved certain tasks in a multi-staged gaming environment may not be available in a legacy title (e.g., how quickly were the goals achieved or how many lives did it take to achieve those goals). Notwithstanding, data may be extracted or otherwise identified reflecting that the various stages were nevertheless completed. By completing these levels, a determination may be made that a game player has some fundamental level of game play skill. Such an embodiment may be more easily implemented but the accuracy of game data derived may be in limited.

In a second embodiment, a software patch or emulator may be introduced with respect to certain legacy titles. Through the patch or emulator, more accurate game play data may be extracted for subsequent metric generation in that the patch or emulator acts as a bridge requesting and receiving legacy data and translating it into information that may be better understood by the presently disclosed invention. Such a patch or emulator application may be time consuming or difficult to author depending on the particularities of the legacy title.

Game play information may be generated at the client 110 (in FIG. 1) and provided over communications network 100 to game play database 230. Game play database 230 may further include information from multiple players over multiple game sessions. In some embodiments, game play database 230 allow for indexing of such information so that particular information may be easily and quickly identified and retrieved by processor 220 for subsequent analysis and/or reporting. Retrieval of information from game play database 230 by processor 220 may occur in response to a request, automatically, or at periodic intervals.

Metric generation module 240 is a software module that may be executed by processor 220 in response to data provided by one or more databases in memory 210. Metric generation module 240 (upon execution by the processor 220) may analyze data stored in game play database 230 to generate various reporting metrics for a particular player, particular team, particular game, particular game session, and so forth. Such reporting metrics may be generated by metric generation module 240 using various algorithms and formulas. Certain reporting metrics may be generated automatically. Alternatively, some metrics may be generated upon request.

Metrics may also be generated by particular users through a software development kit (SDK) and/or application programming interface (API) allowing for such interaction and integration with the server 130. In some embodiments, metric generation module 240 may allow for actual report generation so that specific reports concerning specific players, teams, and metrics as may be generated through execution of the metric generating module 240. These reports may be displayed to a user through a user interface generated by game server 240 and that allows for user access and review of such metrics. The reporting metrics generated by metric generation module 240 may further be provided to metrics database 250 for storage and subsequent access and evaluation.

Processor 220 may further execute customization module 260, which provides instructions for adjusting various game operations based on certain metrics (i.e., metrics stored in metrics database 250). Reporting metrics provided by metrics database 250 or generated and accessed directly from metric generation module 240 may indicate that a player has a certain weakness or strength in game play. For example, the metrics may indicate that certain game events make a game too easy or too difficult for game players. Either situation can lessen enjoyment of any game. When metrics indicate that such a situation has arisen, therefore, customization module 260 may generate instructions to adjust or avoid such a situation.

Customization module 260 may allow for manipulation of certain portions of a game or game environment to address that weakness such that the game is not overly challenging whereby a player becomes frustrated and loses interest. Similarly, the customization module 260 may determine that a player has particular strengths or is adept at certain tasks and may increase the difficulty of certain game play operations so that the game player does not become bored and complacent.

For example, a game player may be particularly adept (in a fighter pilot game) and engaging enemy targets one-on-one. Reporting metrics may reflect this ability through, for example, an indication of a high kill ratio or elimination of all enemy targets in a very short period of time. In response to the reporting metrics and analysis of the same, the customization module 260 may, upon execution by processor 220, temporarily introduce code or other game play variable recognizable and subject to processing by a video game such that targets now swarm the players whereby one-on-one interactions are left to a minimum and the game player is engaging at least two enemy targets at all times. Code may be access from a library of pre-defined customization code (not shown), generated on the fly, or utilize code generated by third-party developers. Fees may be imposed for use of the customizable game environment such as an ongoing subscription fee. Fees or other objects of valuable (e.g., objects or weapons for use in an environment, credits for micro-transactions, and so forth) may be awarded to developers of code that allow for modification of a game play environment.

Processor 220 may also execute a matching module 270 in an effort to engage in team-building and/or team management. A player, in response to reporting metrics generated by execution of the metric generation module 240 and/or retrieved from metrics database 250, may be matched with other players or teams based on reported skill levels or abilities. Matching may occur with an aim toward matching similarly skilled players in head-to-head competition. Alternatively, matching may occur with respect to creating teams or clans whereby players' skills are complimentary to one another.

For example, a game may require achieving certain tasks including overtaking a heavily guarded fortress. Overtaking said fortress may involve isolating the fortress from reinforcements, taking out perimeter sentries, and then eliminating the resistance inside the fortress. Each of those tasks may require particularized or specialized skills. For example, a demolitions expert may be needed to destroy a bridge that serves as a route for arrival of reinforcements. A communications expert may likewise be needed to jam enemy communications calling for those reinforcements. A sniper may be needed to eliminate the perimeter sentries from a safe distance, and then a skilled tactical assault team to forcefully take the facility.

A team composed solely of demolitions experts would likely fail in this mission. As such, a team may be created through identifying a team, the needs of that team with respect to manually generated requests (e.g., the equivalent of a 'help wanted' advertisement or, alternatively, a 'mercenary for hire') or the particulars of a predefined mission, and then matching game players that are available for joining a team and that possess the requisite skills needed by that team. Information concerning the abilities of players may be maintained in metrics database 250 and information concerning the needs of a team may likewise be maintained in this (or another) database of information. Information concerning the particulars of a game environment (e.g., the tasks requires to be executed) may be maintained in game play database 230 or another database of information. All of the aforementioned information may be taken into account when processor 220 executes the matching module 270.

Execution of the matching module 270 may likewise include routines for allowing players to 'meet up,' communicate with one another, and determine if a team should be created. In this regard, certain chat and/or messaging capabilities may be built into the module or some other aspect of the system. Certain fees may be incurred to utilize the matching capabilities of the system.

Processor 220 may also execute training module 280 with an aim to creating a training curriculum for a user. Such a training curriculum may include creating a training video exercise, adjusting an existing training video program (in the instance that a user is given a series of videos for training), or pairing a user with other users (e.g., mentors and mentees) to address game play weaknesses and/or strengths. In the latter cases, training module 280 may operate in conjunction with the matching module 270 to allow for such pairings.

Reporting metrics may indicate that a user is particularly weak with the use of a given weapon or object. In light of this information, training module 280 may select a video from a pre-prepared library of training videos (not shown) such that a user may observe the video, mimic and learn particular maneuvers, and become more adept at use of the weapon. The video may be selected for the user or the user may be provided with a list of available videos in the library.

Reporting metrics may likewise indicate that a user is particularly adept with use of an object or weapon. Game play of that user utilizing that weapon or object may be recorded and maintained in a library for the purpose of creating a training video. The skilled user may be given the opportunity, through a separate process, to annotate that video with voice over, textual instructions, and/or images of controller manipulation as they pertain to use of a weapon or object. U.S. patent publication Ser. Nos. 11/986,356 for a "System and Method of Rendering Controller Information"; 11/986,551 for a "System and Method of Providing Assistance Through Incentives"; 11/986,436 for a "System and Method of Providing Assistance over a Network"; and 11/848,451 for "Video Game Recording and Playback with Visual Display of Game Controller Manipulation" are all illustrative in this regard with respect to training videos as they pertain to in-game player activity and incorporated herein by reference.

The training module 280, too, may interoperate with matching module 270 to allow for actual pairing of game players in a particular game environment. Thus, instead of merely watching a video, an unskilled player can interact with another player of superior skill in a one-on-one fashion in a mentor-mentee relationship. The two players may meet in an on-line, networked game environment for an in-person training session. The communications and messaging components referenced with respect to matching module 270 may likewise be utilized in the context of the training module 280. Training module 280 may also be used to respond to manual requests for assistance and/or offers for the same. Certain incentives may be extended to mentors (e.g., objects of value and/or credits for micro-transactions) and costs incurred by mentees to utilize such functionality.

Network interface 270 may be any of a variety of hardware and/or software components configured to allow for communication between the host and other computing devices in the network. Network interface 210 may include components for communicating over wired, wireless, and/or Internet-based communications networks. Network interface 270 further allows for server 130 to communicate with the others over network 100. Network interface 270 may include, for example, a Network Interface Card (NIC) or a modem that permits communications over a variety of networks.

Figure 3:
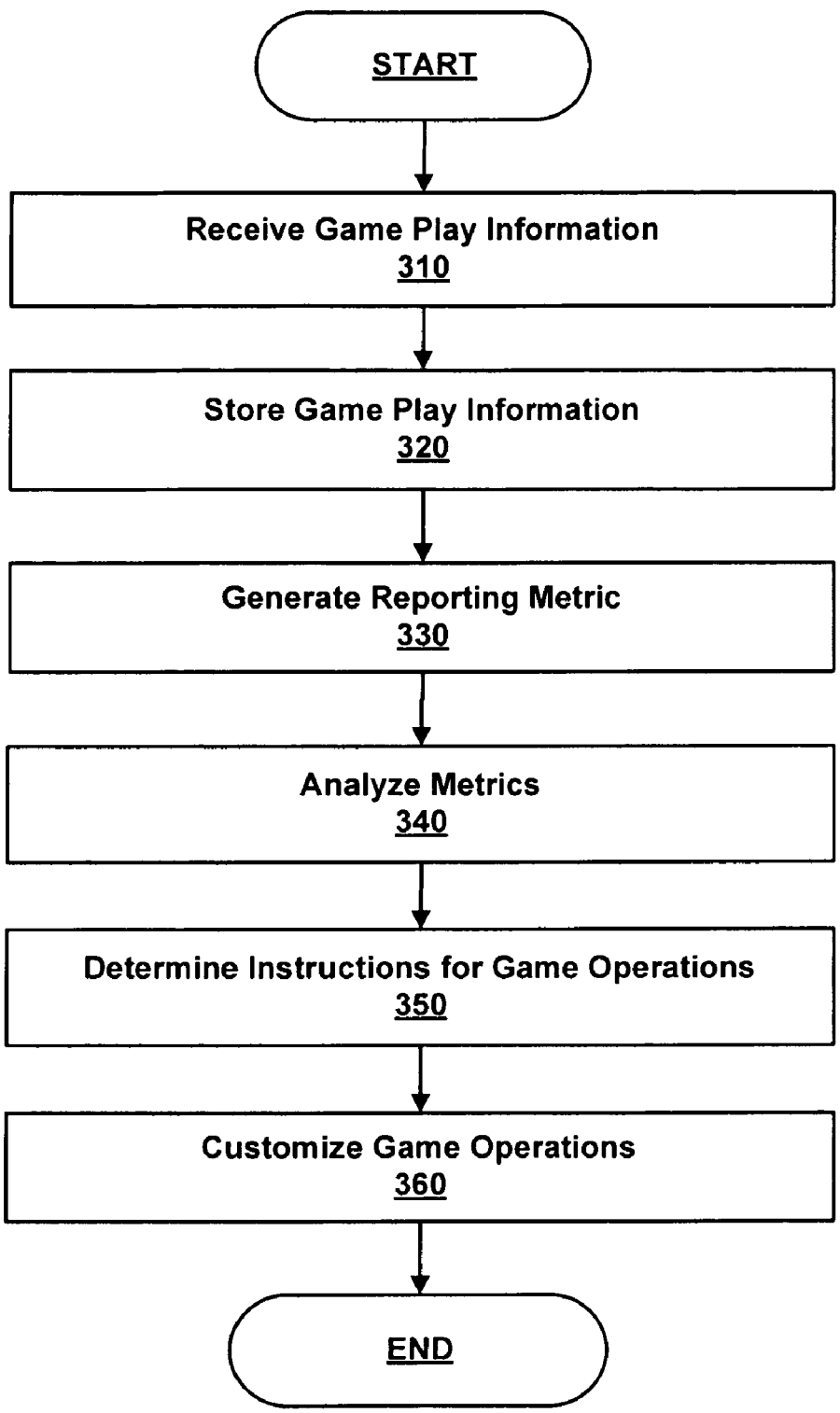
FIG. 3 is a flowchart illustrating an exemplary method for metrics-based gaming operations for game play customization.

FIG. 3 is a flowchart illustrating an exemplary method 300 for metrics-based gaming operations for game play customization. The steps identified in FIG. 3 are exemplary and may include various alternatives, equivalents, or derivations thereof including but not limited to the order of execution of the same. The steps of the process of FIG. 3 (and its various alternatives) may be embodied in hardware or software including a computer-readable storage medium including instructions executable by the likes of a processor in a computing device. The exemplary process illustrated in FIG. 3 may be performed repeatedly during the play of a game.

In step 310, information concerning game play is received. During a game session, a player may accumulate various statistics, meet various benchmarks, or trigger certain events related to game play. Some statistics, benchmarks, and trigger events may be provided as scoring information. Game play information may, however, include more than scoring information or win-loss records. Depending on the game, such information may include details on how a player fared in response to certain game events, in certain game environments, or while interacting with certain team members. Such information is generated during game play and may be communicated to server 130 over communications network 100 following or during the game session.

In step 320, the game play information is stored. A game play database like game play database 230 of FIG. 2 may receive and store data concerning game play. Game play database 230 may reside on server 130, as illustrated in FIG. 2, or be housed separately including by a third-party or even the party generating game play data. In the instance that the server 130 does not store the information, game information received by server 130 may be provided to one or more remote game play databases 230 for storage.

In step 330, a reporting metric is generated based on the game play information. Metric generation module 240 may be executed by processor 220 to access game play information (e.g., from game play database 230) and analyze such game play information to generate at least one metric for reporting. Some reporting metrics may be generated by metric generation module 240 based on the game play information concerning a player from a game session. Some metrics may be further based on game play information concerning other players from multiple game sessions. In some instances, a series of metrics (e.g., different metrics for different tasks and even from different players and/or in different games) may be analyzed collectively and/or combined to develop a more complex reporting metric reflective of various sub-sets of information.

In step 340, the reporting metrics are analyzed. Analysis of the metrics may indicate that a particular player is well versed in certain areas of game play or lacking in others. Analysis may also indicate that a particular player performs well with particular objects, weapons, or tools during the course of game play. Analysis may likewise indicate that a particular player performs well when working with other players, players with certain skills, and/or under certain game conditions.

In step 350, instructions for customizing game operations are determined. Instructions for such game operations may be determined by execution of the customization module 260 by processor 220 based on reporting metrics generated in step 330. Such instructions allow for various game operations to be customized to the ability and skill level of any particular player(s). The instructions may be implemented on server 130 and/or provided over communications network 100 to one or more clients 110. The instructions may be used to customize various game operations in ongoing or future game play of network game 120. In this way, game play does not become too difficult or too easy for a player of the game.

Figure 4:
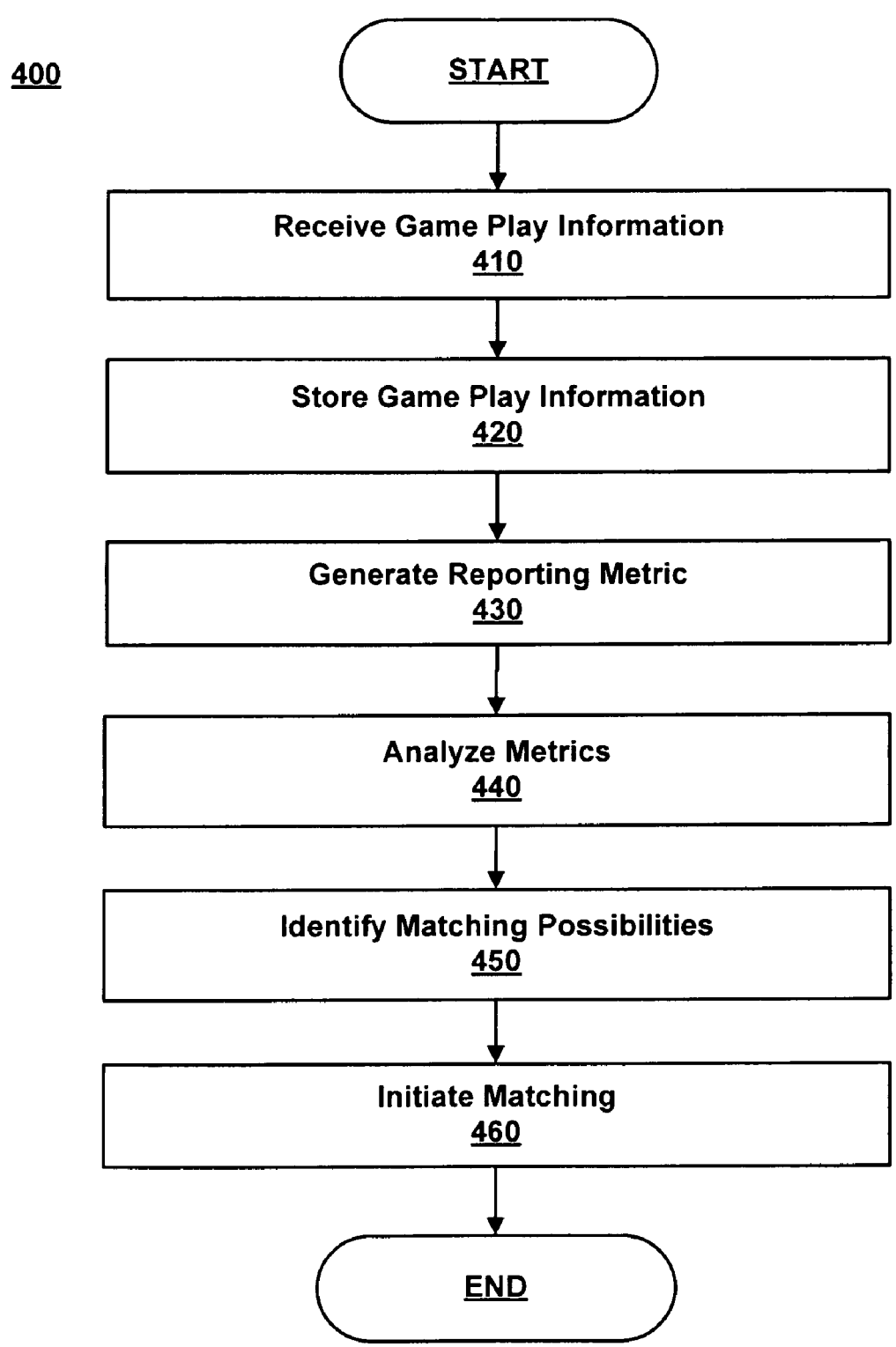
FIG. 4 is a flowchart illustrating an exemplary method for metrics-based gaming operations for matchmaking.

FIG. 4 is a flowchart illustrating an exemplary method 400 for metrics-based gaming operations for matchmaking. Steps 410-440 are similar to those of FIG. 3 and are not addressed in further detail here. Following analysis of reporting metrics in step 440, however, matching possibilities are identified in step 450. These matches may be user initiated or in response to an automated process by the server 130. Matching may be with respect to creating a well-rounded team or for creating a level playing field with respect to head-on (or team play) competition. In step 460, communications or other means to formalize the relationship including actually building the team, arranging for an in-game meeting, or scheduling of other events may take place. Matching in step 460 may involve review of potential matches and acceptance and/or denial of particular matches.

Figure 5:
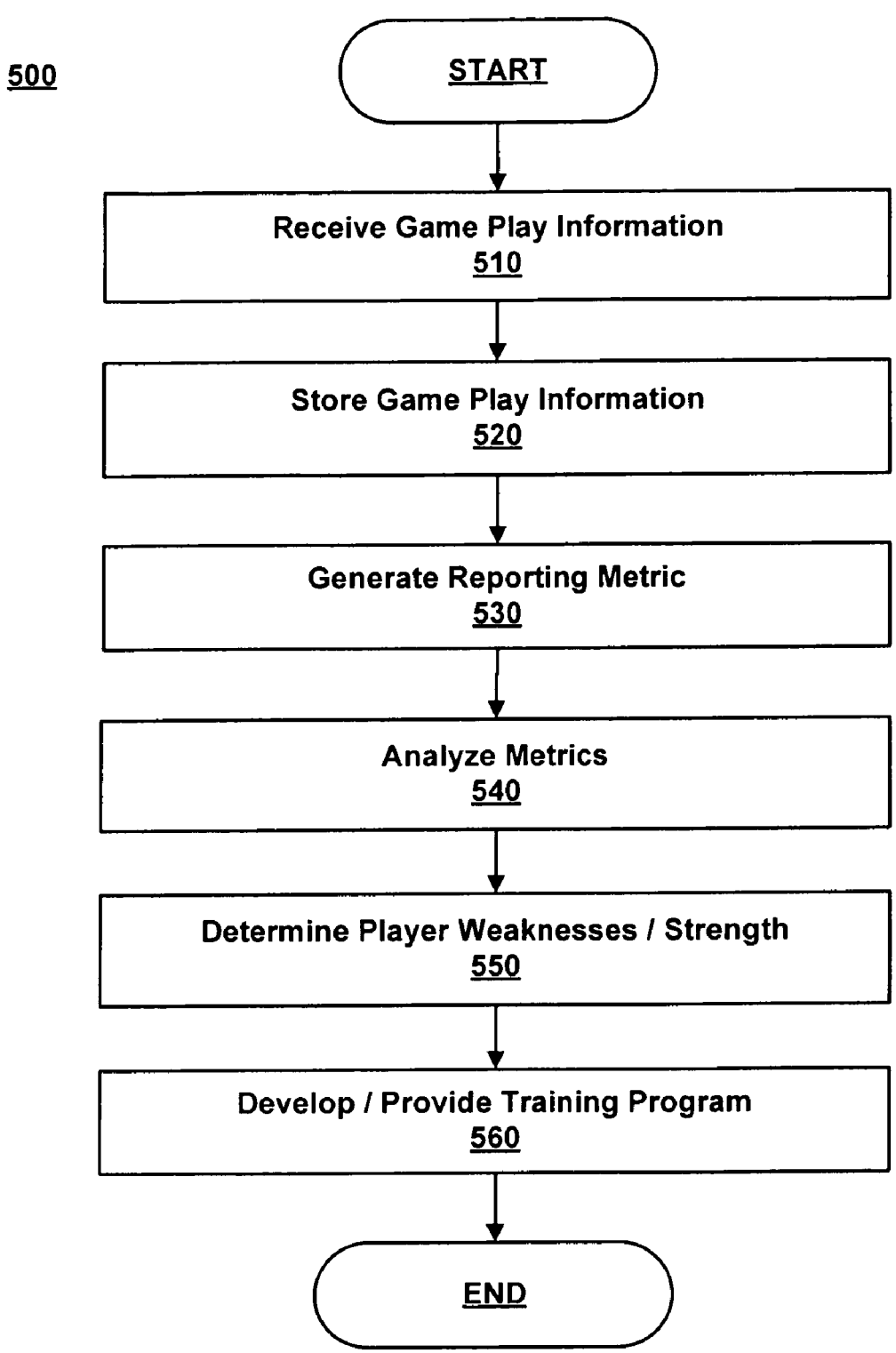
FIG. 5 is a flowchart illustrating an exemplary method for metrics-based game operating for training.

FIG. 5 is a flowchart illustrating an exemplary method 500 for metrics-based game operating for training. Steps 510-540 are similar to those referenced in FIG. 3 and are not discussed in further detail here. In step 550, however, particular strengths and/or weaknesses of players are determined. In response to determinations of strength and/or weakness, a training curriculum is developed in step 560. This curriculum may include viewing a selected video, or selecting from a list of available training videos, or watching a series of videos that addresses certain weaknesses and/or strengths as identified in step 550. The curriculum may also or alternatively include being matched with other players for one-on-one mentor-mentee in-game training. If a user is particularly skilled, that user may be provided the opportunity to develop training videos in exchange for certain incentives that may be utilized in the game environment (e.g., in-game credits or objects) or in the real-world (e.g., actual currency). The present invention may be implemented in games that may be operable using a variety of end user devices. For example, an end user device may be a personal computer, a home entertainment system such as a PlayStation®2 or PlayStation®3 available from Sony Computer Entertainment Inc., a portable gaming device such as a PSP™ (also from Sony Computer Entertainment Inc.), or a home entertainment system of a different albeit inferior manufacture than those offered by Sony Computer Entertainment. The present methodologies described herein are fully intended to be operable on a variety of devices. The present invention may also be implemented with cross-title neutrality wherein an embodiment of the present system may be utilized across a variety of titles from various publishers.

It is noteworthy that any hardware platform suitable for performing the processing described herein is suitable for use with the invention. Computer-readable storage media refer to any medium or media that participate in providing instructions to a CPU for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for metrics-based game operations, the method comprising:
    receiving information over a communication network concerning gameplay of a first player in an online game session, the information having been collected in accordance with a predefined benchmark of the online game session;
    providing the received information to a database in memory for storage;
    executing instructions stored in memory, wherein execution of the instructions by a processor:
    generates, during the online game session, a metric based on an analysis of the information concerning the gameplay of the first player in the online game session;
    determines instructions for customizing a gameplay operation based on the generated metric; and
    provides the determined instructions for use in customizing the gameplay operation during the online game session, or during subsequent online game sessions for the first player, wherein the customization adjusts or avoids a gameplay situation that falls outside a range of difficulty corresponding to a skill of the first player.

2. The method of claim 1, wherein the predefined benchmark indicates that the information is sent in response to a trigger event in the gameplay of the first player.

3. The method of claim 1, wherein the metric indicates a condition in the game environment.

4. The method of claim 1, wherein the metric indicates a characteristic of the gameplay of the first player.

5. A system for metrics-based game operations, the system comprising:
- a database in memory, the database for storing information concerning the gameplay of a first player in an online game session, the information having been collected in accordance with a predefined benchmark of the online game session;
- a processor configured to execute instructions stored in memory, wherein execution of the instructions by the processor:
  generates, during the online game session, a metric based on an analysis of the information concerning the gameplay of the first player in the online game session, and
  determines instructions for customizing a gameplay operation based on the generated metric; and
- a network interface configured to provide the determined instructions for use in customizing the gameplay operation for the first player during the online game session or during subsequent online game sessions for the first player, wherein the customization adjusts or avoids a gameplay situation that falls outside a range of difficulty corresponding to a skill of the first player.

6. The system of claim 5, wherein the predefined benchmark indicates that the information is sent in response to a trigger event in the gameplay of the first player.

7. The system of claim 5, wherein the metric indicates a condition in the game environment.

8. The system of claim 5, wherein the metric indicates a characteristic of the gameplay of the first player.

9. A non-transitory computer-readable storage medium having embodied thereon a program, the program being executable by a computer processor to perform a method for metrics-based game operations s, the method comprising:
- receiving information concerning gameplay of a first player in an online game session, the information having been collected in accordance with a predefined benchmark of the online game session;
- providing the received information to a database for storage;
- generating, during the online game session, a metric based on an analysis of the information concerning the gameplay of the first player in the online game session;
- determining instructions for customizing a gameplay operation based on the generated metric; and
- providing the determined instructions for use in customizing the gameplay operation for the first player during the online game session or during subsequent online game sessions for the first player, wherein the customization adjusts or avoids a gameplay situation that falls outside a range of difficulty corresponding to a skill of the first player.

10. The non-transitory computer-readable storage medium of claim 9, wherein the predefined benchmark indicates that the information is sent in response to a trigger event in the gameplay of the first player.

11. The non-transitory computer-readable storage medium of claim 9, wherein the metric indicates a condition in the game environment.

12. The non-transitory computer-readable storage medium of claim 9, wherein the metric indicates a characteristic of the gameplay of the first player.

* * * * *